United States Patent
Qiu (10) Patent No.: US 9,210,707 B2
(45) Date of Patent: Dec. 8, 2015

(54) SENSING THRESHOLD DETERMINING METHOD AND SENSOR NODE DEVICE

(71) Applicant: Huawei Technologies Co., Ltd., Shenzhen, Guangdong (CN)

(72) Inventor: Jing Qiu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 248 days.

(21) Appl. No.: 14/035,606

(22) Filed: Sep. 24, 2013

(65) Prior Publication Data

US 2014/0024405 A1    Jan. 23, 2014

Related U.S. Application Data

(63) Continuation of application No. PCT/CN2011/083834, filed on Dec. 12, 2011.

(30) Foreign Application Priority Data

Mar. 31, 2011    (CN) .......................... 2011 1 0079885

(51) Int. Cl.
*H04W 72/04*    (2009.01)
*H04W 16/14*    (2009.01)
(Continued)

(52) U.S. Cl.
CPC .......... *H04W 72/0453* (2013.01); *H04W 16/14* (2013.01); *H04W 8/005* (2013.01); *H04W 48/16* (2013.01); *H04W 72/00* (2013.01)

(58) Field of Classification Search
CPC ..... H04W 16/14; H04W 48/16; H04W 72/00; H04W 72/0453; H04W 8/005; H04W 72/085; H04W 84/18
See application file for complete search history.

(56) References Cited

U.S. PATENT DOCUMENTS 6,487,414 B1    11/2002    Tanay et al.
8,064,840 B2 *  11/2011    McHenry et al. .......... 455/67.16
(Continued)

FOREIGN PATENT DOCUMENTS

CN    101521526 A    9/2009
CN    101577564 A    11/2009
WO    WO 2010035159 A1    4/2010

OTHER PUBLICATIONS

International Search Report in corresponding PCT Patent Application No. PCT/CN2011/083834 (Mar. 15, 2012).
(Continued)

*Primary Examiner* — Fanghwa Wang
(74) *Attorney, Agent, or Firm* — Leydig, Voit & Mayer, Ltd.

(57) ABSTRACT

Embodiments of the present invention provide a sensing threshold determining method and a sensor node device. The sensing threshold determining method includes: measuring, by a sensor node, a target frequency band and determining used frequencies in the target frequency band and received signal strength of the sensor node at the used frequencies, where the used frequencies in the target frequency band include frequencies being used or having been used by a primary user transmitter in the target frequency band; and determining, by the sensor node, a sensing threshold for unused frequencies in the target frequency band according to the received signal strength at the used frequencies, where the unused frequencies include frequencies that are not used by the primary user transmitter in the target frequency band. With the embodiments of the present invention, a sensor node can determine a proper sensing threshold for unused frequencies.

14 Claims, 3 Drawing Sheets

(51) Int. Cl.
*H04W 8/00* (2009.01)
*H04W 72/00* (2009.01)
*H04W 48/16* (2009.01)

(56) References Cited

U.S. PATENT DOCUMENTS

2009/0141662 A1 6/2009 Gurney et al.
2010/0081387 A1* 4/2010 Shi et al. .................... 455/62

OTHER PUBLICATIONS

Gurney et al., "Geo-location Database Techniques for Incumbent Protection in the TV White Space," 3$^{rd}$ IEEE Symposium on New Frontiers in Dynamic Spectrum Access Networks, pp. 1-9, Institute of Electrical and Electronics Engineers, New York, New York (Oct. 14-17, 2008).

Lee et al., "Energy Detector using Adaptive-Fixed Thresholds in Cognitive Radio Systems," Proceedings of 14$^{th}$ IEEE Asia-Pacific Conference on Communications, pp. 1-4, Institute of Electrical and Electronics Engineers, New York, New York (Oct. 14-17, 2008).

Gorcin et al., "An Adaptive Threshold Method for Spectrum Sensing in Multi-Channel Cognitive Radio Networks," 17$^{th}$ IEEE International Conference on Telecommunications, pp. 425-429, Institute of Electrical and Electronics Engineers, New York, New York (Apr. 4-7, 2010).

Sun et al., "Analysis on Aggregation Interference in Cognitive Networks Based on In-Band Spectrum Sensing," 2010, Institute of Signal Processing and Transmission, Nanjing University of Posts and Telecommunications, Nanjing, China.

* cited by examiner

SENSING THRESHOLD DETERMINING METHOD AND SENSOR NODE DEVICE

CROSS-REFERENCE TO RELATED APPLICATIONS

This application is a continuation of International Patent Application No. PCT/CN2011/083834, filed on Dec. 12, 2011, which claims priority to Chinese Patent Application No. 201110079885.5, filed on Mar. 31, 2011, both of which are hereby incorporated by reference in their entireties.

FIELD OF THE INVENTION

Embodiments of the present invention relate to the field of communication technologies, and in particular, to a sensing threshold determining method and a sensor node device.

BACKGROUND OF THE INVENTION

With the fast increase of radio communication service requirements, spectrum resources available currently are becoming fewer and fewer. Large quantities of spectrum tests, however, prove that the "shortage" of spectrum resources is not a result of the lack of spectrum resources but a result of the insufficient utilization of the spectrum resources caused by the current fixed spectrum management policy. Cognitive radio (Cognitive Radio, CR hereinafter) can sense the radio communication environment, dynamically detect and efficiently utilize idle spectrum resources, and allow a secondary user to have multidimensional spectrum reuse with a primary user in time, frequency, and space. This greatly relieves the constraint of spectrum and bandwidth restriction on the development of radio technologies. This technology is believed to be one of the hottest radio technologies in the future.

Spectrum sensing is a key technology of cognitive radio. The purpose of spectrum sensing is to monitor and detect activities of the primary user signals in a specific frequency band: When an idle spectrum is detected, the cognitive radio system can use the frequency band; and when a primary user signal is detected, the cognitive radio system must exit the frequency band in a specified duration. The performance of spectrum sensing mainly depends on the following factors:

Sensing threshold: it is the minimum primary user signal strength that a sensor node needs to detect. If, at a frequency, the sensor node detects that the primary user signal strength exceeds the sensing threshold, it can be considered that the primary user appears at the frequency; otherwise, it can be determined that the frequency is idle and can be used.

Primary user protection time: it is the maximum interference time allowed for the primary user, which is the time from when the primary user appears to when the secondary system is detected and exits the frequency.

Sensing performance: it includes detection probability and false alarm probability, where, when the detection probability is higher, the protection for the primary user is better and when the false alarm probability is lower, the service continuity of the secondary system is more benefited.

In the prior art, the sensing threshold determining method is to calculate the received signal strength at a specific location as the actual sensing threshold in the location by using the transmit power of the primary user and based on a certain channel model.

Conventional channel models are all general channel models specific to a certain landform, where, with regard to a certain landform (such as urban area, suburban area, opening area, and mountain area), as long as the distance to the primary user transmitter is the same, whatever geographic environment the sensor node is located in, the sensor node has the same sensing threshold. This will result in the inconformity between the calculated sensing threshold and the actual sensing threshold. If the sensing threshold is determined based on the conventional method, the sensing threshold may be set too high, so that the detection probability is lower, or the sensing threshold is set too low, so that the sensing overhead is increased and the false alarm probability is higher. Therefore, the conventional sensing threshold determining method has great defects.

When the conventional method is adopted to determine the sensing threshold, it is necessary to learn information, such as the location of the television (Television, TV hereinafter) transmitter and the transmit power, but such information is not available at will in any county and region. If the information is not learned in advance, it is hard to determine the sensing threshold in the location of the sensor node and a uniform low sensing threshold has to be adopted to restrain the behaviors of the sensor node, thereby resulting in a too low sensing threshold.

SUMMARY OF THE INVENTION

Embodiments of the present invention provide a sensing threshold determining method and a sensor node device, so that a sensor node determines a proper sensing threshold for unused frequencies by measuring the received signal strength of frequencies used by a primary user transmitter.

An embodiment of the present invention provides a sensing threshold determining method, including:

measuring, by a sensor node, a target frequency band and determining used frequencies in the target frequency band and received signal strength of the sensor node at the used frequencies, where the used frequencies in the target frequency band include frequencies being used or having been used by a primary user transmitter in the target frequency band; and determining, by the sensor node, a sensing threshold for unused frequencies in the target frequency band according to the received signal strength at the used frequencies, where the unused frequencies include frequencies that are not used by the primary user transmitter in the target frequency band.

An embodiment of the present invention provides a sensor node device, including:

a measuring module, configured to measure a target frequency band and determine used frequencies in the target frequency band and received signal strength of the sensor node device at the used frequencies, where the used frequencies in the target frequency band include frequencies being used or having been used by a primary user transmitter in the target frequency band; and a determining module, configured to determine a sensing threshold for unused frequencies in the target frequency band according to the received signal strength at the used frequencies determined by the measuring module, where the unused frequencies include frequencies that are not used by the primary user transmitter in the target frequency band.

In the embodiments of the present invention, the sensor node measures the target frequency band, determines the received signal strength at the used frequencies in the target frequency band, and determines the sensing threshold for the unused frequencies according to the received signal strength at the used frequencies, so that the sensor node can determine a proper sensing threshold for the unused frequencies.

BRIEF DESCRIPTION OF THE DRAWINGS

To better explain the technical solutions of the embodiments of the present invention, the accompanying drawings required in the description of the embodiments of the present invention are briefly described hereunder. Apparently, the accompanying drawings illustrate only some exemplary embodiments of the present invention and persons of ordinary skill in the art can derive other drawings from these drawings without creative efforts.

DETAILED DESCRIPTION OF THE EMBODIMENTS

To better explain the purposes, technical solutions, and advantages of the embodiments of the present invention, the technical solutions of the embodiments of the present invention are hereinafter described clearly and completely with reference to the accompanying drawing. Apparently, the embodiments to be described are only some embodiments of the present invention rather than all embodiments of the present invention. Based on the embodiments of the present invention, other embodiments derived by persons of ordinary skill in the art without creative efforts shall fall within the protection scope of the present invention.

Figure 1:
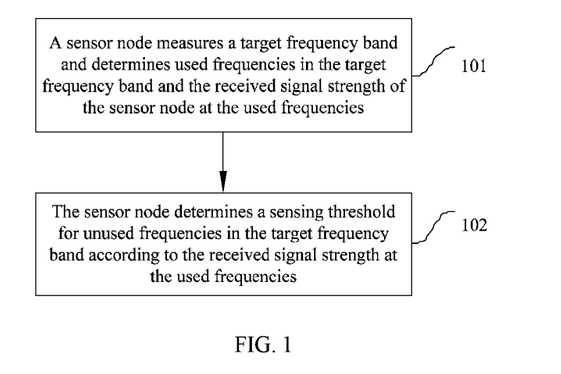
FIG. 1 is a flowchart of a sensing threshold determining method according to an embodiment of the present invention.

FIG. 1 is a flowchart of a sensing threshold determining method in an embodiment of the present invention. The following is an application scenario of the embodiment:

The same transmit power is adopted each time when the same primary user transmitter uses the same frequency; the transmit power of the transmit signals of the same mode of the same primary user transmitter is the same at all frequencies. The application scenario of the sensing threshold determining method provided in the embodiment is to sense primary user signals, such as TV signals.

As shown in FIG. 1, the sensing threshold determining method may include the following steps:

Step 101: A sensor node measures a target frequency band and determines used frequencies in the target frequency band and the received signal strength of the sensor node at the used frequencies, where the used frequencies in the target frequency band include frequencies being used or having been used by the primary user transmitter in the target frequency band.

Step 102: The sensor node determines a sensing threshold for unused frequencies in the target frequency band according to the received signal strength at the used frequencies, where the unused frequencies include frequencies not used by the primary user transmitter in the frequency band.

Specifically, the sensor node may calculate the path loss difference of the primary user transmitter between the used frequencies and the unused frequencies and then calculate a sum of the received signal strength at the used frequencies, the path loss difference of the primary user transmitter between the used frequencies and the unused frequencies and the transmit power difference of the primary user transmitter between the used frequencies and the unused frequencies, where the sum of the received signal strength, the path loss difference, and the transmit power difference is used as a sensing threshold for the unused frequencies in the target frequency band.

In an implementation manner of the embodiment, the calculating the path loss difference of the primary user transmitter between the used frequencies and the unused frequencies may be as follows: The sensor node determines a channel model formula between the primary user transmitter and the sensor node, and calculates the path loss difference of the primary user transmitter between the used frequencies and the unused frequencies according to the formula.

In another implementation manner of the embodiment, the calculating the path loss difference of the primary user transmitter between the used frequencies and the unused frequencies may be as follows: The sensor node determines two transmit antenna height reference values in the empirical field strength values of a channel model between the primary user transmitter and the sensor node according to the actual height of the transmit antenna of the primary user transmitter and obtains the field strength values corresponding to the used frequencies and the unused frequencies at the heights corresponding to the two transmit antenna height reference values through frequency interpolation; then according to the above field strength values corresponding to the used frequencies and the unused frequencies, the sensor node obtains the field strength values corresponding to the used frequencies and the unused frequencies at the actual height through interpolation of the actual height of the transmit antenna of the primary user transmitter; then, the sensor node may calibrate a field strength curve with respect to the difference between the actual height of the receive antenna of the sensor node and a receive antenna height reference value in the empirical field strength values and obtain the calibration values corresponding to the used frequencies and the unused frequencies; finally, the sensor node may calculate the path loss corresponding to the used frequencies according to the field strength values corresponding to the used frequencies and the calibration values corresponding to the used frequencies at the actual height and calculate the path loss corresponding to the unused frequencies according to the field strength values corresponding to the unused frequencies and the calibration values corresponding to the unused frequencies at the actual height, and then calculate the path loss difference of the primary user transmitter between the used frequencies and the unused frequencies according to the path loss corresponding to the used frequencies and the path loss corresponding to the unused frequencies.

The implementation process of the sensing threshold determining method provided in the embodiment is described hereunder through a specific example.

1. It is assumed that $f_1$ is a used frequency in a target frequency band, that is, $f_1$ is a frequency being used or having been used by a primary user transmitter in the target frequency. When the primary user transmitter is using $f_1$, a sensor node measures $f_1$ and determines that the received signal strength of the sensor node at $f_1$ is $S_1$. Then, $S_1$ can be used as the sensing threshold of $f_1$, that is, $$\text{Sensing threshold } (f_1) = S_1 \quad (1)$$

Hereinafter, Sensing threshold ($f_1$) is used to indicate the sensing threshold of $f_1$.

2. It is assumed that $f_2$ is an unused frequency, that is, $f_2$ is a frequency that has not been used by the primary user transmitter in the target frequency band, and the sensor node does not learn when the primary user transmitter will use $f_2$. Through the method provided in the embodiment of the present invention illustrated in FIG. 1, the sensor node may determine the sensing threshold of $f_2$ according to the received signal strength $S_1$ at $f_1$. In the description hereinafter, the sensing threshold of $f_2$ is described as "Sensing threshold ($f_2$)". Specifically, $$\text{Sensing threshold }(f_2) = \text{Sensing threshold }(f_1) + \Delta L(f_1, f_2) + \Delta P(f_1, f_2) \quad (2)$$

In equation (2), $\Delta L(f_1, f_2)$ represents the path loss difference of the same primary user transmitter between $f_1$ and $f_2$; $\Delta P(f_1, f_2)$ represents the transmit power difference of the same primary user transmitter between $f_1$ and $f_2$, and with regard to a TV signal, if a TV signal mode is the same at $f_1$ and $f_2$, $\Delta P(f_1, f_2) = 0$.

The following describes how the sensor node calculates the sensing threshold of $f_2$ according to sensing threshold ($f_1$) by taking two channel models as an example.

a. If the channel model between the primary user transmitter and the sensor node has a specific formula, the sensor node may calculate the sensing threshold of f2 directly by using the formula.

Taking the Okumura-Hata channel model as an example, the empirical formulas of the Okumura-Hata channel model are as follows:

Urban area $$L = 69.55 + 26.16 lg(f) - 13.82 lg(h_t) - \alpha(h_r) + [44.9 - 6.55 lg(h_t)] lg(d) \quad (3)$$

Suburban area $L = L_{Urban\ area} - 2[lg(f/28)]^2 - 5.4 \quad (4)$

Rural area $L = L_{Urban\ area} - 4.78(\log f)^2 + 18.33 \log(f) - 40.98 \quad (5)$ In equations (3) to (5), f represents a carrier frequency; $h_t$ and $h_r$ represent the height of a transmit antenna and the height of a receive antenna, respectively; d is the distance between a transmitter and a receiver; $\alpha(h_r)$ is a mobile antenna calibration factor and its value depends on an environment as follows:

$$\alpha(h_r) = \begin{cases} 3.2(lg11.75h_r)^2 - 4.97 & f \geq 300 \text{ MHz} \quad \text{metropolis} \\ 8.29(lg1.54h_r)^2 - 1.1 & f < 300 \text{ MHz} \quad \text{metropolis} \\ (1.1lgf - 0.7)h_r - (1.56lgf - 0.8) & \text{small and medium-sized cities} \end{cases}$$

According to the above channel model, in different environments, for a primary user transmitter and sensor node, the path loss difference caused by frequency difference is:

Urban area $$\Delta L(f_1, f_2) = \begin{cases} 26.16 lg(f_1/f_2) & \text{metropolis} \\ (27.72 - 1.1h_r) lg(f_1/f_2) & \text{small and medium-sized cities} \end{cases}$$

Suburban area $$\Delta L(f_1, f_2) =$$

$$\begin{cases} 26.16 lg(f_1/f_2) - 2[lg(f_1/28)]^2 + 2[lg(f_2/28)]^2 & \text{metropolis} \\ (27.72 - 1.1h_r) lg(f_1/f_2) - 2[lg(f_1/28)]^2 + 2[lg(f_2/28)]^2 & \text{small and medium-sized cities} \end{cases}$$

Rural area $$\Delta L(f_1, f_2) =$$

$$\begin{cases} 44.49 lg(f_1/f_2) - 4.78(lg f_1)^2 + 4.78(lg f_2)^2 & \text{metropolis} \\ (46.05 - 1.1h_r) lg(f_1/f_2) - 4.78(lg f_1)^2 + 4.78(lg f_2)^2 & \text{small and medium-sized cities} \end{cases}$$

Based on the above formulas, the corresponding sensing threshold for a primary user transmitter at $f_2$ can be calculated as follows:

$$\text{Sensing threshold }(f_2) = \text{Sensing threshold }(f_1) + \Delta L(f_1, f_2)$$

b. If the channel model between the primary user transmitter and the sensor node cannot be expressed in a uniform formula, for example, the ITU-R P.1546-4 channel model, the empirical field strength values in different landforms at several typical frequencies (100 MHz, 600 MHz, or 2000 MHz) are given. When the channel model is used to determine the sensing threshold of $f_2$, the following steps can be adopted:

Step 1: Select two proper transmit antenna height reference values $h_{ref1}$ and $h_{ref2}$ from the empirical field strength values of the above channel model according to the actual height of the transmit antenna of the primary user transmitter and obtain the field strength values corresponding to $f_1$ and $f_2$ at the two heights through frequency interpolation.

$$E(f_1, h_{ref1}) = E_{inf, h_{ref1}} + (E_{sup, h_{ref1}} - E_{inf, h_{ref1}}) \log(f_1/f_{inf}) / \log(f_{sup}/f_{inf}) \quad (6)$$

$$E(f_1, h_{ref2}) = E_{inf, h_{ref2}} + (E_{sup, h_{ref2}} - E_{inf, h_{ref2}}) \log(f_1/f_{inf}) / \log(f_{sup}/f_{inf}) \quad (7)$$

$$E(f_2, h_{ref1}) = E_{inf, h_{ref1}} + (E_{sup, h_{ref1}} - E_{inf, h_{ref1}}) \log(f_2/f_{inf}) / \log(f_{sup}/f_{inf}) \quad (8)$$

$$E(f_2, h_{ref2}) = E_{inf, h_{ref2}} + (E_{sup, h_{ref2}} - E_{inf, h_{ref2}}) \log(f_2/f_{inf}) / \log(f_{sup}/f_{inf}) \quad (9)$$

Step 2: Obtain the field strength values corresponding to $f_1$ and $f_2$ at the actual height through the interpolation of the actual height of the transmit antenna of the primary user transmitter according to the field strength values obtained through equations (6) to (9).

$$E(f_1,h_t)=E(f_1,h_{ref1})+(E(f_1,h_{ref2})-E(f_1,h_{ref1}))\log(h_t/h_{ref1})/\log(h_{ref2}/h_{ref1}) \quad (10)$$

$$E(f_2,h_t)=E(f_2,h_{ref1})+(E(f_2,h_{ref2})-E(f_2,h_{ref1}))\log(h_t/h_{ref1})/\log(h_{ref2}/h_{ref1}) \quad (11)$$

Step 3: Perform field strength curve calibration with respect to the difference between the actual height $h_r$ of the receive antenna of the sensor node and the receive antenna height reference value $h_{ref}$ in the empirical field strength values to obtain the calibration values corresponding to $f_1$ and $f_2$, respectively.

$$\Delta C(f_1,h_r)=(3.2+6.2 \lg(f_1))*\lg(h_r/h_{ref}) \quad (12)$$

$$\Delta C(f_2,h_r)=(3.2+6.2 \lg(f_2))*\lg(h_r/h_{ref}) \quad (13)$$

Step 4: Calculate the path loss corresponding to $f_1$ and $f_2$, respectively, and the path loss difference between $f_1$ and $f_2$.

$$L(f_1)=139.3-E(f_1,h_t)-\Delta C(f_1,h_r)+20 \lg(f_1) \quad (14)$$

$$L(f_2)=139.3-E(f_2,h_t)-\Delta C(f_2,h_r)+20 \lg(f_2) \quad (15)$$

$$\Delta L(f_1,f_2)=L(f_1)-L(f_2) \quad (16)$$

Figure 2:
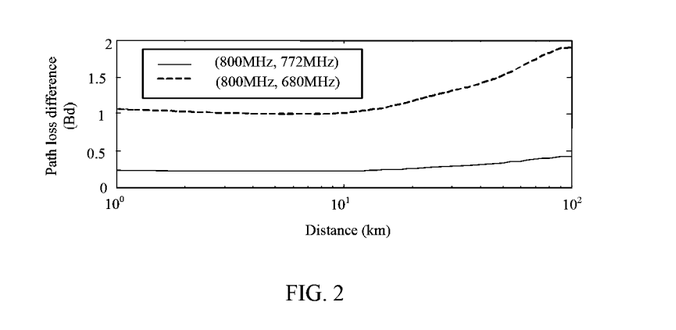
FIG. 2 is a schematic diagram of path loss difference curves according to an embodiment of the present invention.

FIG. 2 is a schematic diagram of a path loss difference curve in an embodiment of the present invention. In FIG. 2, the path loss difference curves of two groups of different frequencies are given in a scenario where the actual height of the transmit antenna of the primary user transmitter (for example, a TV transmitter) $h_t$=200 m, and the actual height of the receive antenna of the sensor node $h_r$=30 m. The path loss difference changes with the distance between a transmitter and a receiver. But when the difference between two frequencies is small, for example, two frequencies 800 MHz and 772 MHz in FIG. 2, the path loss differences of the two frequencies in different locations will not exceed 0.5 dB. With the increase of the frequency difference, the loss difference is gradually larger.

Step 5: Calculate the sensing threshold at the target frequency f2 in the location (d) of the sensor node as follows:

Sensing threshold $(f_2)$=Sensing threshold $(f_1)+\Delta L(f_1,f_2,d)$

In the foregoing embodiment, the sensor node measures the target frequency band, determines the received signal strength at the used frequency in the target frequency band, and determines the sensing threshold of the unused frequency according to the received signal strength at the used frequencies, so that the sensor node can determine a proper sensing threshold for the unused frequency and the sensing threshold can be set according to the actual environment of the sensor node without the need to learn the transmit power of the primary user transmitter in advance. Factors, such as landform information, may also be effectively screened, thereby avoiding the defect of round planning in the prior art. In addition, with the method provided in the embodiment, the sensing threshold can be simply set and optimized without prior information of the primary user transmitter. Moreover, based on the existing prior information of primary user transmitters, the sensing thresholds of multiple primary user transmitters can be set and optimized simultaneously.

Figure 3:
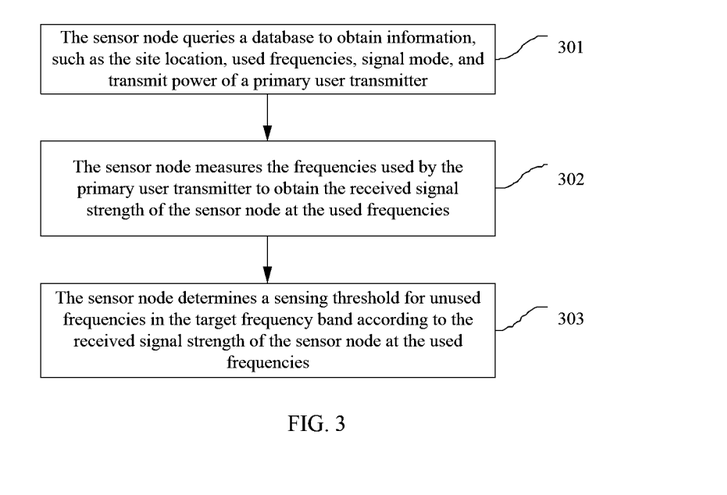
FIG. 3 is a flowchart of a sensing threshold determining method according to another embodiment of the present invention.

FIG. 3 is a flowchart of a sensing threshold determining method in another embodiment of the present invention. In the embodiment, the sensing threshold determining method in a scenario where prior information of primary user transmitters can be obtained is described. At present, in some countries, for example, most countries in Europe and America, the utilization information of TV signals is open. That is, the location of each TV tower and frequencies used by each TV tower and the transmit power corresponding to each TV tower are all known and the transmit power of the same TV tower is the same at all frequencies, which means $\Delta P(f_1,f_2)=0$ in equation (2). Therefore, for a TV frequency being used, the sensor node can always measure, according to the open prior information, the received signal strength at the frequency being used.

As shown in FIG. 3, the sensing threshold determining method may include the following steps:

Step 301: The sensor node queries a database to obtain information, such as the site location, used frequencies, signal mode, and transmit power of a primary user transmitter.

Step 302: The sensor node measures the frequencies used by the primary user transmitter to obtain the received signal strength of the sensor node at the used frequencies and determines the correspondence between the received signal strength of the sensor node at the used frequencies and the used frequencies of the primary user transmitter.

Step 303: The sensor node determines a sensing threshold for unused frequencies in the target frequency band according to the received signal strength of the sensor node at the used frequencies.

Specifically, in an implementation manner of the embodiment, the sensor node queries the database to determine the primary user transmitter that uses the unused frequencies in the target frequency band, and according the received signal strength of the sensor node at the used frequencies, determines the sensing threshold when the primary user transmitter uses the unused frequencies in the target frequency band.

In another implementation manner of the embodiment, when the sensor node cannot determine the primary user transmitter that uses the unused frequencies in the target frequency band, the sensor node may determine, according to the received signal strength of the sensor node at the used frequencies, the sensing thresholds when all primary user transmitters around the sensor node use the unused frequencies in the target frequency band, and may select a lowest sensing threshold in the determined sensing thresholds as the sensing threshold for the unused frequencies in the target frequency band.

For the sensing threshold determining method, reference can be made to the method provided in the embodiment of the present invention shown in FIG. 1, and details are not repeated herein.

In the embodiment, if the signals received by the sensor node at a frequency are superposed signals from multiple primary user transmitters, the sensor node cannot differentiate the respective received signal strength of different primary user transmitters at the frequency, and therefore, cannot determine the sensing threshold of the unused frequencies in the target frequency band.

In the embodiment, when the sensor node can obtain the prior information of primary user transmitters, the sensor node can learn which primary user transmitters around the location of the sensor node use the same frequency. the sensor node measures the frequencies used by the primary user transmitters to obtain the received signal strength of the sensor node at the used frequencies of the primary user transmitters, which can adopt one of the following manners:

(1) When the sensor node determines that there is at least one common frequency in the frequencies used by at least two primary user transmitters and there is at least one frequency in addition to the common frequency in the frequencies used by the at least two primary user transmitters, the sensor node measures the frequencies other than the common frequency in the frequencies used by the at least two primary user transmitters to determine the received signal strength of the sensor node at the frequencies other than the common frequency for the at least two primary user transmitters.

For example, it is assumed that the frequencies used by primary user transmitter 1 are $f_1$, $f_2$, and $f_3$, that is, <primary user transmitter 1, $(f_1, f_2, f_3)$, $(S_1, S_2, ?)$>, where $S_1$ and $S_2$ are the received signal strength of the sensor node at $f_1$ and $f_2$, respectively; it is assumed the frequencies used by primary user transmitter 2 are $f_3$, $f_4$, and $f_5$, that is, <primary user transmitter 2, $(f_3, f_4, f_5)$, $(?, S_4, S_5)$>, where $S_4$ and $S_5$ are the received signal strength of the sensor node at $f_4$ and $f_5$, respectively. In this case, the sensor node may not measure the common frequency $f_3$. With regard to primary user transmitter 1, the sensor node may measure $f_2$ or $f_3$ to determine the received signal strength of the sensor node at $f_2$ or $f_3$; with regard to primary user transmitter 2, the sensor node may measure $f_4$ or $f_5$ to determine the received signal strength of the sensor node at $f_4$ or $f_5$.

(2) When the sensor node determines, according to the used frequencies of the primary user transmitter, that all frequencies used by a first primary user transmitter around the sensor node are the same as a portion of frequencies used by a second primary user transmitter around the sensor node, the sensor node measures any of the frequencies used by the second primary user transmitter that are different from the frequencies used by the first primary user transmitter to determine the received signal strength of the sensor node at the above any used frequency for the second primary user transmitter; according to the received signal strength at the above any used frequency, the sensor node uses the method provided in the embodiment of the present invention shown in FIG. 1 to determine the received signal strength of the sensor node at the same used frequencies as the first primary user transmitter for the second primary user transmitter and then subtracts the received signal strength of the sensor node at the same used frequencies as the first primary user transmitter for the second primary user transmitter from the superposed signal strength received by the sensor node at the same frequencies used by the first primary user transmitter and the second primary user transmitter to obtain the received signal strength of the sensor node at the same used frequencies for the first primary user transmitter.

For example, it is assumed that the frequencies used by primary user transmitter 1 are $f_1$ and $f_2$, that is, <primary user transmitter 1, $(f_1, f_2)$, $(?, ?)$>; it is assumed that the frequencies used by primary user transmitter 2 are $f_1$, $f_2$, and $f_3$, that is, <primary user transmitter 2, $(f_1, f_2, f_3)$, $(?, ?, S_3)$>, where $S_3$ is the received signal strength of the sensor node at $f_3$. In this case, the sensor node measures $f_3$ to determine the received signal strength of the sensor node at $f_3$ for primary user transmitter 2; then according to the received signal strength of the sensor node at $f_3$ for primary user transmitter 2, the sensor node uses the method provided in the embodiment of the present invention shown in FIG. 1 to determine the received signal strength of the sensor node at $f_1$ and $f_2$ for primary user transmitter 2; then the sensor node subtracts the received signal strength of the sensor node at $f_1$ for primary user transmitter 2 from the superposed signal strength received by the sensor node at f1 to obtain the received signal strength of the sensor node at $f_1$ for primary user transmitter 1and likewise, subtracts the received signal strength of the sensor node at $f_2$ for primary user transmitter 2 from the superposed signal strength received by the sensor node at $f_2$ to obtain the received signal strength of the sensor node at $f_2$ for primary user transmitter 1.

(3) When the sensor node determines, according to the used frequencies of the primary user transmitter, that at least two of the primary user transmitters around the sensor node use the same frequencies, the sensor node cannot differentiate the received signal strength corresponding to each primary user transmitter. In this case, the sensor node can only set the sensing threshold to the lowest value defined in a protocol. For example, the lowest TV signal sensing threshold defined in the Federal Communication Commission (Federal Communication Commission, abbreviated to FCC) is −114 dBm.

In the foregoing embodiment, the sensor node can determine a proper sensing threshold for an unused frequency, and the sensing threshold can be set according to the actual environment of the sensor node without the need to learn the transmit power of the primary user transmitter in advance. Factors, such as landform information, can also be effectively screened, thereby avoiding the defect of round planning in the prior art. In addition, with the method provided in the embodiment, the sensing threshold can be simply set and optimized without prior information of the primary user transmitter. Moreover, based on the existing prior information of primary user transmitters, the sensing thresholds of multiple primary user transmitters can be set and optimized simultaneously.

Figure 4:
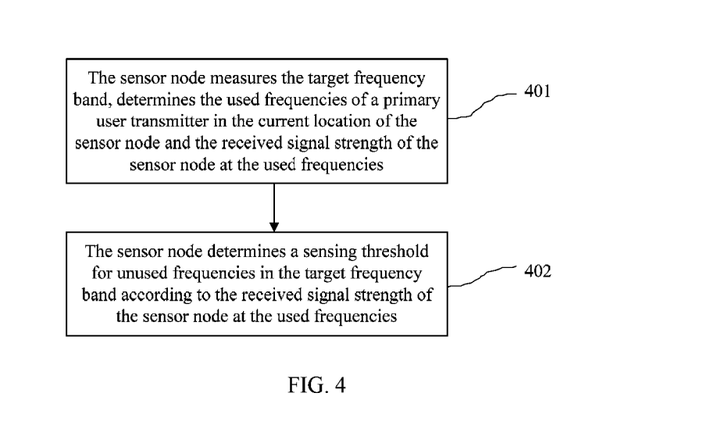
FIG. 4 is a flowchart of a sensing threshold determining method according to still another embodiment of the present invention.

FIG. 4 is a flowchart of a sensing threshold determining method in still another embodiment of the present invention. In the embodiment, the sensing threshold determining method in a scenario where the prior information of primary user transmitters cannot be obtained is described. At present, in some countries and regions, China for example, the utilization information of TV signals is not open, that is, the sensor node cannot correctly learn in advance information, such as the locations, used frequencies, and transmit power of all TV towers. The sensor node needs to measure the entire frequency band of a primary user transmitter to find out which frequencies are being used and the received signal strength of the sensor node at these frequencies, so as to further determine the sensing thresholds of unused frequencies in the target frequency band in the location of the sensor node.

As shown in FIG. 4, the sensing threshold determining method may include the following steps:

Step 401: The sensor node measures the target frequency band, determines the frequencies used by a primary user transmitter in the current location of the sensor node and the received signal strength of the sensor node at the used frequencies, and determines the correspondence between the received signal strength of the sensor node at the used frequencies and the used frequencies of the primary user transmitter.

Step 402: The sensor node determines a sensing threshold for unused frequencies in the target frequency band according to the received signal strength of the sensor node at the used frequencies.

In the embodiment, because the sensor node cannot determine the primary user transmitter that uses the unused frequencies in the target frequency band, the sensor node needs to determine, according to the received signal strength of the sensor node at the used frequencies, the sensing thresholds when all primary user transmitters around the sensor node use the unused frequencies in the target frequency band, and selects a lowest sensing threshold in the determined sensing thresholds as the sensing threshold for the unused frequencies in the target frequency band.

For the sensing threshold determining method, reference can be made to the method provided in the embodiment of the present invention shown in FIG. 1, and details are not repeated herein.

If the signals received by the sensor node at a frequency are superposed signals from multiple primary user transmitters, the sensor node cannot differentiate the respective received signal strength of different primary user transmitters at the frequency, and therefore, cannot determine the sensing threshold of the unused frequencies in the target frequency band. In the embodiment, because the sensor node cannot obtain prior information of primary user transmitters, the sensor node can only set the sensing threshold to the lowest value that is defined in a protocol. For example, the lowest TV signal sensing threshold defined in the FCC is −114 dBm.

In the foregoing embodiment, the sensor node can determine a proper sensing threshold for an unused frequency, and the sensing threshold can be set according to the actual environment of the sensor node without the need to learn the transmit power of the primary user transmitter in advance. Factors, such as landform information, can also be effectively screened, thereby avoiding the defect of round planning in the prior art. In addition, with the method provided in the embodiment, the sensing threshold can be simply set and optimized without prior information of the primary user transmitter. Moreover, based on the existing prior information of primary user transmitters, the sensing thresholds of multiple primary user transmitters can be set and optimized simultaneously.

Persons of ordinary skill in the art can understand that all or part of the steps in the method embodiment can be implemented by a program instructing relevant hardware. The program is stored in a computer readable storage medium and when the program is executed, the steps in the method embodiment are executed. The storage medium is any medium that can store program codes, such as a ROM, a RAM, a magnetic disk, or a CD-ROM.

Figure 5:
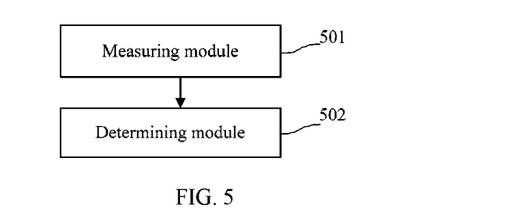
FIG. 5 is a schematic structural diagram of a sensor node device according to an embodiment of the present invention.

FIG. 5 is a schematic structural diagram of a sensor node device in an embodiment of the present invention. In the embodiment, the sensor node device can implement the procedure of the embodiment of the present invention shown in FIG. 1. As shown in FIG. 5, the sensor node device includes:

a measuring module 51, configured to measure a target frequency band and determine used frequencies in the target frequency band and the received signal strength of the sensor node device at the used frequencies, where the used frequencies in the target frequency band include frequencies being used or having been used by a primary user transmitter in the target frequency band; and a determining module 52, configured to determine a sensing threshold for unused frequencies in the target frequency band according to the received signal strength at the used frequencies determined by the measuring module 51, where the unused frequencies include frequencies that are not used by the primary user transmitter in the frequency band.

In the embodiment, the measuring module 51 measures the target frequency band and determines the received signal strength at the used frequencies in the target frequency band, and the determining module 52 determines the sensing threshold of the unused frequencies according to the received signal strength at the used frequencies determined by the measuring module, so that the sensor node device can determine a proper sensing threshold for the unused frequencies and the sensing threshold can be set according to the actual environment of the sensor node device without the need to learn the transmit power of the primary user transmitter in advance. Factors, such as landform information, can also be effectively screened, thereby avoiding the defect of round planning in the prior art. In addition, with the sensor node device provided in the embodiment, the sensing threshold can be simply set and optimized without prior information of the primary user transmitter. Moreover, based on the existing prior information of primary user transmitters, the sensing thresholds of multiple primary user transmitters can be set and optimized simultaneously.

Figure 6:
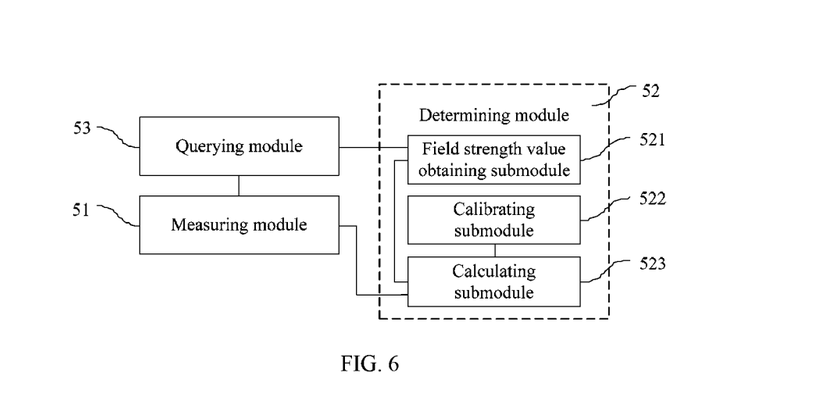
FIG. 6 is a schematic structural diagram of a sensor node device according to another embodiment of the present invention.

FIG. 6 is a schematic structural diagram of a sensor node device in another embodiment of the present invention. The sensor node device in the embodiment can implement the procedures of the embodiments shown in FIG. 1, FIG. 3, and FIG. 4. Compared with the sensor node device shown in FIG. 5, the difference lies in that, in the sensor node device shown in FIG. 6, the determining module 52 may calculate the path loss difference of the primary user transmitter between the used frequencies and the unused frequencies and calculate a sum of the received signal strength at the used frequencies, the path loss difference of the primary user transmitter between the used frequencies and the unused frequencies, and the transmit power difference of the primary user transmitter between the used frequencies and the unused frequencies, where the sum of the received signal strength, the path loss difference, and the transmit power difference is used as the sensing threshold of the unused frequencies in the target frequency band.

Specifically, in an implementation manner of the embodiment, the determining module 52 may first determine a channel model formula between the primary user transmitter and the sensor node device and then calculate the path loss difference of the primary user transmitter between the used frequencies and the unused frequencies according to the formula.

In another implementation manner of the embodiment, the determining module 52 may include:

a field strength value obtaining submodule 521, configured to determine two transmit antenna height reference values from the empirical field strength values of a channel model between the primary user transmitter and the sensor node device according to the actual height of the transmit antenna of the primary user transmitter, and obtain the field strength values corresponding to the used frequencies and the unused frequencies at the heights corresponding to the two transmit antenna height reference values through frequency interpolation; and according to the above field strength values corresponding to the used frequencies and the unused frequencies, obtain the field strength values corresponding to the used frequencies and the unused frequencies at the actual height through the interpolation of the actual height of the transmit antenna of the primary user transmitter;

a calibrating submodule 522, configured to perform field strength curve calibration with respect to the difference between the actual height of the receive antenna of the sensor node device and the receive antenna height reference value in the empirical field strength values, and obtain the calibration values corresponding to the used frequencies and the unused frequencies; and a calculating submodule 523, configured to calculate the path loss corresponding to the used frequencies according to the field strength values that are corresponding to the used frequencies and are obtained by the field strength value obtaining submodule 521 and the calibration values that are corresponding to the used frequencies and are obtained by the calibrating submodule 522; calculate the path loss corresponding to the unused frequencies according to the field strength values that are corresponding to the unused frequencies and are obtained by the field strength value obtaining submodule 521 and the calibration values that are corresponding to the unused frequencies and are obtained by the calibrating submodule 522; and calculate the path loss difference of the primary user transmitter between the used frequencies and the unused frequencies according to the path loss corresponding to the used frequencies and the path loss corresponding to the unused frequencies; and calculate a sum of the received signal strength at the used frequencies determined by the measuring module 51, the path loss difference of the primary user transmitter between the used frequencies and the unused frequencies, and the transmit power difference of the primary user transmitter between the used frequencies and the unused frequencies, where the sum of the received signal strength, the path loss difference, and the transmit power difference is used as the sensing threshold of the unused frequencies in the target frequency band.

Further, in the embodiment, the sensor node device may also include:

a querying module 53, configured to query a database to obtain the site location, used frequencies, signal mode, and transmit power of the primary user transmitter; then, the measuring module 51 may measure the frequencies used by the primary user transmitter to obtain the received signal strength of the sensor node device at the used frequencies.

In addition, the querying module 53 may query the database to determine the primary user transmitter using the unused frequencies in the target frequency band, and the determining module 52 may determine, according to the received signal strength of the sensor node device at the used frequencies, the sensing threshold when the primary user transmitter uses the unused frequencies in the target frequency band.

In addition, the determining module 52 may measure the target frequency band and determine the frequencies used by the primary user transmitter in the current location of the sensor node device and the received signal strength of the sensor node device at the used frequencies.

In the embodiment, when the primary user transmitter that uses the unused frequencies in the target frequency band cannot be determined, the determining module 52 may determine, according to the received signal strength of the sensor node device at the used frequencies, the sensing thresholds when all primary user transmitters around the sensor node device use the unused frequencies in the target frequency band, and may select a lowest sensing threshold in the determined sensing thresholds as the sensing threshold for the unused frequencies in the target frequency band.

In the embodiment, when it is determined according to the used frequencies of the primary user transmitter that there is at least one common frequency in the frequencies used by at least two primary user transmitters and there is at least one frequency in addition to the common frequency in the frequencies used by the at least two primary user transmitters, the measuring module 51 may measure the frequencies other than the common frequency in the frequencies used by the at least two primary user transmitters to determine the received signal strength of the sensor node device at the frequencies other than the common frequency for the at least two primary user transmitters; or, when it is determined according to the used frequencies of the primary user transmitter that all frequencies used by a first primary user transmitter around the sensor node device are the same as a portion of frequencies used by a second primary user transmitter around the sensor node device, the measuring module 51 may measure any of the frequencies used by the second primary user transmitter that are different from the frequencies used by the first primary user transmitter to determine the received signal strength of the sensor node device at the above any used frequency for the second primary user transmitter; the measuring module 51 determines the received signal strength of the sensor node device at the same used frequencies as the first primary user transmitter for the second primary user transmitter according to the received signal strength at the above any used frequency, and then subtracts the received signal strength of the sensor node at the same used frequencies as the first primary user transmitter for the second primary user transmitter from the superposed signal strength received by the sensor node at the same frequencies used by the first primary user transmitter and the second primary user transmitter to obtain the received signal strength of the sensor node at the same used frequencies for the first primary user transmitter.

The sensor node device can determine a proper sensing threshold for an unused frequency and the sensing threshold can be set according to the actual environment of the sensor node device without the need to learn the transmit power of the primary user transmitter in advance. Factors, such as landform information, can also be effectively screened, thereby avoiding the defect of round planning in the prior art. In addition, with the sensor node device provided in the embodiment, the sensing threshold can be simply set and optimized without prior information of the primary user transmitter. Moreover, based on the existing prior information of primary user transmitters, the sensing thresholds of multiple primary user transmitters can be set and optimized simultaneously.

Those skilled in the art should understand that the accompanying drawings illustrate the exemplary embodiments of the present invention and the modules or procedures in the accompanying drawings may probably not be necessary for the implementation manner of the present invention.

Those skilled in the art understand the modules of the device in the embodiments may be disposed in the apparatuses as described in the embodiments or disposed in one or more apparatuses other than the apparatuses in the embodiments. The modules in the embodiments may be combined into one module or further decomposed to several submodules.

Finally, it should be noted that the above embodiments are used only to describe the technical solutions of the present invention instead of limiting the present invention. Although the present invention is described in detail with reference to the embodiments, those of ordinary skill in the art should understand that they can still make modifications to the technical solutions described in the embodiments or make equivalent substitutions to some technical features thereof without departing from the spirit and scope of the technical solutions of the embodiments of the present invention.

What is claimed is:

1. A sensing threshold determining method, comprising:
   measuring, by a sensor node, a target frequency band;
   determining, by the sensor node, a used frequency in the target frequency band and received signal strength of the sensor node at the used frequency, wherein the used frequency in the target frequency band comprises a frequency being used or having been used by a primary user transmitter in the target frequency band; and
   determining, by the sensor node, a sensing threshold for an unused frequency in the target frequency band according to the received signal strength at the used frequency, wherein the unused frequency comprises a frequency not used by the primary user transmitter in the target frequency band wherein the determining by the sensor node the sensing threshold for the unused frequency in the target frequency band according to the received signal strength at the used frequency comprises:
- calculating b the sensor node, a path loss difference of the primary user transmitter between the used frequency and the unused frequency, and
- determining, by the sensor node, the sensing threshold for the unused frequency in the target frequency band to be a sum of the received signal strength at the used frequency, the path loss difference of the primary user transmitter between the used frequency and the unused frequency, and a transmit power difference of the primary user transmitter between the used frequency and the unused frequency.

2. The method according to claim 1, wherein the calculating the path loss difference of the primary user transmitter between the used frequency and the unused frequency comprises:
- determining, by the sensor node, a channel model formula between the primary user transmitter and the sensor node; and
- determining, by the sensor node, two transmit antenna height reference values from empirical field strength values of a channel model between the primary user transmitter and the sensor node according to an actual height of a transmit antenna of the primary user transmitter and obtaining field strength values corresponding to the used frequency and the unused frequency at heights corresponding to the two transmit antenna height reference values through frequency interpolation;
- obtaining, according to the field strength values corresponding to the used frequency and the unused frequency, field strength values corresponding to the used frequency and the unused frequency at the actual height through interpolation of the actual height of the transmit antenna of the primary user transmitter;
- performing field strength curve calibration with respect to a difference between an actual height of a receive antenna of the sensor node and a receive antenna height reference value in the empirical field strength values and obtaining the calibration values corresponding to the used frequency and the unused frequency, respectively;
- calculating path loss corresponding to the used frequency according to a field strength value corresponding to the used frequency at the actual height and a calibration value corresponding to the used frequency;
- calculating path loss corresponding to the unused frequency according to a field strength value corresponding to the unused frequency at the actual height and a calibration value corresponding to the unused frequency; and
- calculating the path loss difference of the primary user transmitter between the used frequency and the unused frequency according to the path loss corresponding to the used frequency and the path loss corresponding to the unused frequency.

3. The method according to claim 1, wherein before the measuring, by the sensor node, the target frequency band and determining the used frequency in the target frequency band and the received signal strength of the sensor node at the used frequency, the method further comprises:
- querying, by the sensor node, a database to obtain a site location, a used frequency, a signal mode, and transmit power of the primary user transmitter;

the measuring, by the sensor node, the target frequency band and determining the used frequency in the target frequency band and the received signal strength of the sensor node at the used frequency comprise:
- measuring, by the sensor node, the frequency used by the primary user transmitter to obtain the received signal strength of the sensor node at the used frequency.

4. The method according to claim 3, wherein the determining, by the sensor node, the sensing threshold for the unused frequency in the target frequency band according to the received signal strength at the used frequency further comprises:
- querying, by the sensor node, the database to determine a primary user transmitter that uses the unused frequency in the target frequency band, and according the received signal strength of the sensor node at the used frequency, determining the sensing threshold when the primary user transmitter uses the unused frequency in the target frequency band.

5. The method according to claim 1, wherein the measuring, by the sensor node, the target frequency band and determining the used frequency in the target frequency band and the received signal strength of the sensor node at the used frequency comprise:
- measuring, by the sensor node, the target frequency band and determining the frequency used by the primary user transmitter in a current location of the sensor node and the received signal strength of the sensor node at the used frequency.

6. The method according to claim 1, wherein the determining, by the sensor node, the sensing threshold for the unused frequency in the target frequency band according to the received signal strength at the used frequency comprises:
- when the sensor node cannot determine a primary user transmitter that uses the unused frequency in the target frequency band, determining, by the sensor node according to the received signal strength of the sensor node at the used frequency, sensing thresholds when each primary user transmitter around the sensor node uses the unused frequencies in the target frequency band and selecting a lowest sensing threshold in the determined sensing thresholds as the sensing threshold for the unused frequency in the target frequency band.

7. The method according to claim 3, wherein the measuring, by the sensor node, the target frequency band and determining the used frequency in the target frequency band and the received signal strength of the sensor node at the used frequency comprise one of:
- when the sensor node determines, according to a used frequency of a primary user transmitter, that there is at least one common frequency in frequencies used by at least two primary user transmitters and there is at least one frequency in addition to the at least one common frequency in the frequencies used by the at least two primary user transmitters, measuring, by the sensor node, a frequency other than the at least one common frequency in the frequencies used by the at least two primary user transmitters to determine received signal strength of the sensor node at the frequency other than the at least one common frequency for the at least two primary user transmitters; and
- when the sensor node determines, according to a used frequency of a primary user transmitter, that all frequencies used by a first primary user transmitter around the sensor node are the same as a portion of frequencies used by a second primary user transmitter around the sensor node, measuring, by the sensor node, any of the frequencies used by the second primary user transmitter that are different from the frequencies used by the first primary user transmitter to determine received signal strength of the sensor node at the above any used frequency for the second primary user transmitter, determining received signal strength of the sensor node at the frequencies used by the second primary user transmitter that are the same as the frequencies used by the first primary user transmitter according to the received signal strength at the frequency, and subtracting the received signal strength of the sensor node at the frequencies used by the second primary user transmitter that are the same as the frequencies used by the first primary user transmitter from superposed signal strength received by the sensor node at the frequencies used by both the first primary user transmitter and the second primary user transmitter to obtain received signal strength of the sensor node at the frequencies used by both the first primary user transmitter and the second primary user transmitter.

8. A sensor node device, comprising:

a measuring module, configured to:

measure a target frequency band, and determine a used frequency in the target frequency band and received signal strength of the sensor node device at the used frequency, wherein the used frequency in the target frequency band comprises a frequency being used or having been used by a primary user transmitter in the target frequency band; and a determining module, configured to:

determine a sensing threshold for an unused frequency in the target frequency band according to the received signal strength at the used frequency determined by the measuring module, wherein the unused frequency comprises a frequency not used by the primary user transmitter in the target frequency band, calculate a path loss difference of the primary user transmitter between the used frequency and the unused frequency, and determine the sensing threshold for the unused frequency in the target frequency band to be a sum of the received signal strength at the used frequency, the path loss difference of the primary user transmitter between the used frequency and the unused frequency, and a transmit power difference of the primary user transmitter between the used frequency and the unused frequency.

9. The device according to claim 8, wherein the determining module is further configured to determine a channel model formula between the primary user transmitter and the sensor node device and calculate the path loss difference of the primary user transmitter between the used frequency and the unused frequency according to the formula;

wherein the determining module comprises:

a field strength value obtaining submodule, configured to determine two transmit antenna height reference values from empirical field strength values of a channel model between the primary user transmitter and the sensor node device according to an actual height of a transmit antenna of the primary user transmitter and obtain field strength values corresponding to the used frequency and the unused frequency at heights corresponding to the two transmit antenna height reference values through frequency interpolation; and configured to obtain field strength values corresponding to the used frequency and the unused frequency at the actual height through interpolation of the actual height of the transmit antenna of the primary user transmitter according to the field strength values corresponding to the used frequency and the unused frequency;

a calibrating submodule, configured to perform field strength curve calibration with respect to a difference between an actual height of a receive antenna of the sensor node device and a receive antenna height reference value in the empirical field strength values and obtain the calibration values corresponding to the used frequency and the unused frequency, respectively; and a calculating submodule, configured to calculate path loss corresponding to the used frequency according to a field strength value corresponding to the used frequency and obtained by the field strength value obtaining submodule and a calibration value corresponding to the used frequency and obtained by the calibrating submodule; calculate path loss corresponding to the unused frequency according to a field strength value corresponding to the unused frequency and obtained by the field strength value obtaining submodule and a calibration value corresponding to the unused frequency and obtained by the calibrating submodule; and calculate the path loss difference of the primary user transmitter between the used frequency and the unused frequency according to the path loss corresponding to the used frequency and the path loss corresponding to the unused frequency; and calculate a sum of the received signal strength at the used frequency, the path loss difference of the primary user transmitter between the used frequency and the unused frequency, and the transmit power difference of the primary user transmitter between the used frequency and the unused frequency, wherein the sum of the received signal strength, the path loss difference, and the transmit power difference is used as the sensing threshold for the unused frequency in the target frequency band.

10. The device according to claim 8, further comprising:

a querying module, configured to query a database to obtain a site location, a used frequency, a signal mode, and transmit power of the primary user transmitter;

wherein the measuring module is further configured to measure the frequency used by the primary user transmitter to obtain the received signal strength of the sensor node device at the used frequency.

11. The device according to claim 10, wherein:

the querying module is further configured to query the database to determine a primary user transmitter that uses the unused frequency in the target frequency band; and the determining module is further configured to determine, according to the received signal strength of the sensor node device at the used frequency, the sensing threshold when the primary user transmitter uses the unused frequency in the target frequency band.

12. The device according to claim 8, wherein the determining module is further configured to measure the target frequency band and determine the frequency used by the primary user transmitter in a current location of the sensor node device and the received signal strength of the sensor node device at the used frequency.

13. The device according to claim 8, wherein the determining module is further configured to:

determine, according to the received signal strength of the sensor node device at the used frequency when a primary user transmitter that uses the unused frequency in the target frequency band cannot be determined, sensing thresholds when each primary user transmitter around the sensor node device uses the unused frequencies in the target frequency band, and select a lowest sensing threshold in the determined sensing thresholds as the sensing threshold for the unused frequency in the target frequency band.

14. The device according to claim 10, wherein:

the measuring module is further configured to, when it is determined according to a used frequency of a primary user transmitter that there is at least one common frequency in frequencies used by at least two primary user transmitters and there is at least one frequency in addition to the at least one common frequency in the frequencies used by the at least two primary user transmitters, measure a frequency other than the at least one common frequency in the frequencies used by the at least two primary user transmitters to determine received signal strength of the sensor node at the frequency other than the at least one common frequency for the at least two primary user transmitters; or the measuring module is further configured to, when it is determined according to a used frequency of a primary user transmitter that all frequencies used by a first primary user transmitter around the sensor node device are the same as a portion of frequencies used by a second primary user transmitter around the sensor node device, measure any of the frequencies used by the second primary user transmitter that are different from the frequencies used by the first primary user transmitter to determine received signal strength of the sensor node device at the above any used frequency for the second primary user transmitter; determine received signal strength of the sensor node device at same used frequencies as the first primary user transmitter for the second primary user transmitter according to the received signal strength at the above any used frequency and subtract the received signal strength of the sensor node device at the same used frequencies as the first primary user transmitter for the second primary user transmitter from superposed signal strength received by the sensor node device at the same frequencies used by the first primary user transmitter and the second primary user transmitter to obtain received signal strength of the sensor node device at the same used frequencies for the first primary user transmitter.

\* \* \* \* \*

UNITED STATES PATENT AND TRADEMARK OFFICE
CERTIFICATE OF CORRECTION

| | | |
|---|---|---|
| PATENT NO. | : 9,210,707 B2 | Page 1 of 1 |
| APPLICATION NO. | : 14/035606 | |
| DATED | : December 8, 2015 | |
| INVENTOR(S) | : Jing Qiu | |

It is certified that error appears in the above-identified patent and that said Letters Patent is hereby corrected as shown below:

In the Claims

Column 15, line 7, "calculating b the" should read -- calculating by the --.

Signed and Sealed this
Twelfth Day of July, 2016

Michelle K. Lee
*Director of the United States Patent and Trademark Office*